United States Patent
Johnson et al.

[11] 3,720,145
[45] March 13, 1973

[54] PORTRAIT CAMERA HAVING SYNCHRONIZED FLASH ILLUMINATION SOURCE

[75] Inventors: Bruce K. Johnson, Andover; William A. Shelton, Cambridge, both of Mass.

[73] Assignee: Polaroid Corporation, Cambridge, Mass.

[22] Filed: June 29, 1970

[21] Appl. No.: 50,648

[52] U.S. Cl..................................95/11.5 R, 95/11 L
[51] Int. Cl.................................................G03b 9/70
[58] Field of Search.....95/11.5 R, 11 L; 240/1.3, 2 C

[56] References Cited

UNITED STATES PATENTS

| 3,296,949 | 1/1967 | Bounds | 95/11 R |
| 3,478,660 | 11/1969 | Land | 95/11.5 |
| 2,972,673 | 2/1961 | Graef | 240/1.3 |
| 2,542,311 | 2/1951 | Carlson | 240/1.3 |
| 3,488,486 | 1/1970 | Bretthauer | 240/1.3 |
| 3,172,345 | 3/1965 | Jakob et al. | 95/11 L |

OTHER PUBLICATIONS

Neblette, Photography: Its Principles and Practice, 1938, p. 132

Primary Examiner—John M. Horan
Assistant Examiner—Kenneth C. Hutchison
Attorney—Brown and Mikulka, William D. Roberson and Gerald L. Smith

[57] ABSTRACT

A portrait camera designed for closeups, having a Fresnel lens in front of the flashcube mount for focusing light from the flashcube into a relatively narrow and limited field angle, corresponding to the narrow field of view of the objective lens of the camera, and for directing light toward the axis of the camera lens.

11 Claims, 3 Drawing Figures

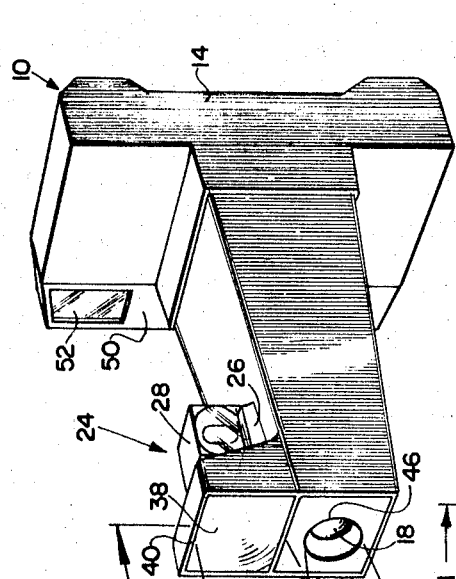
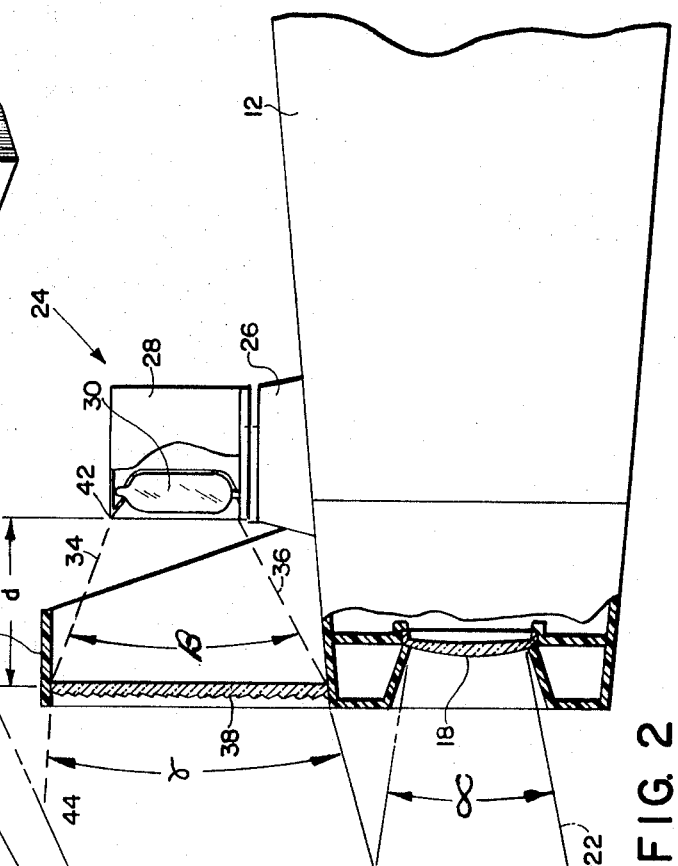

PORTRAIT CAMERA HAVING SYNCHRONIZED FLASH ILLUMINATION SOURCE

BACKGROUND

Photographic portraiture has been the subject of aesthetically as well as technically orientated study throughout the history of photography. In the course of development of the art and its related technology, portraitists have evolved a myriad of techniques, specialized equipment and studio arrangements to achieve what are considered desirable portraits. Because of the highly specialized nature of the art and its equipment, photographic portrait systems have not been commercially introduced at cost scales commensurate with popularly priced cameras of a variety suited for the amateur market. Conversely, conventional cameras, suited for use within the amateur or high volume market, are not operationally versatile enough to permit an inexperienced amateur photographer to take casual portrait pictures evidencing a more desirable or significant quality.

Generally, several technical aspects must be considered in order to photographically record portraits evidencing a more pleasing quality. Among these technical considerations, perhaps the most predominant is that of avoiding a perspective distortion of the image of a subject. This apparent distortion of the image generally occurs where a conventional camera is positioned to photograph a subject at relatively close distances. The resulting picture often shows a very pronounced distortion of the relative proportions of a subject, i.e. the head is misshapen and the nose or other features may appear relatively oversized. Where camera-to-subject distance is increased, perspective distortion is diminished, however, increased subject distance renders the recorded image too small for conventional film-frame formats. Professional portraitists conventionally diminish unwanted perspective distortion to suitable tolerances through the use of relatively large, tripod or platform supported cameras incorporating objective lenses having relatively long focal lengths. These cameras are positioned in a studio setting in conjunction with photographic lighting units of relatively high illumination capacity. With suitable training, the professional photographer manipulates and adjusts both camera and lighting to achieve subjectively desirable portrait results.

In view of the above, it may be apparent that designs for portrait cameras of a small, portable and convenient size suited for the amateur or popularly priced camera market are not easily arrived at. While being inexpensive and easy to fabricate, such cameras must incorporate a lens-imaging system having an appropriately extended focal length in combination with a film format size which is adequate for casual portrait photography. This specialized imaging system must be capable of performing in conjunction with conveniently derived sources of light, for instance flash illumination. The light so derived must provide consistently adequate subject lighting. Further the portrait camera must perform satisfactorily when handheld, as opposed to being platform or tripod supported.

Lens designers relying upon a scaling technique for altering a conventional amateur camera to one having an extended focal length imaging system find that existing lens aberrations are scaled up proportionally, and more expensive lenses are required to achieve equivalent image quality within a given film format. Additionally, in order to retain a capability of working with convenient light sources, it may be desirable to retain an equivalent $f$ number as a conventional lens is scaled to one having a longer focal length. To achieve this, a greater aperture size must be accepted. This greater aperture size inherently produces a decreasing depth of field. For conveniently sized camera systems, this depth of field may diminish to a point adversely affecting the camera's performance.

Another difficulty arising in the design of a portrait camera as now envisioned is concerned with the availability of adequate subject lighting. Portrait lens systems having adequate focal lengths operative in connection with film formats of convenient size often must work at camera-to-subject distances and f stops requiring a light intensity beyond the output capacities of conventional packaged flash units. A mere extension of the output capacities of conventional flash units may result in intensities of flash illumination which cause ophthalmic discomfort to a photographic subject.

Packaged multi-lamp flash units, when considered for use with the amateur portrait camera now contemplated, may tend to create harsh and undesirable shadow effects. These effects stem from the relatively miniature sizes of the source of light established by the units.

A related design complication for the subject cameras resides in the imaging performance of their optical systems. For instance, should the camera require relatively slower shutter speeds, image blurring may occur as a result of the sensitivity to camera movement of the longer focal length imaging systems.

In view of the foregoing, it may be recognized that any design for popularly priced portrait camera must account for the cost and performance of its optical system, limitations in available lighting, image size and high sensitivity to blurring effects occasioned with handheld camera support.

SUMMARY

The present invention provides a photographic camera particularly suited for use with portrait photography and the like. Incorporating an imaging system establishing a field of view of relatively narrow angular extent, the camera enjoys the capability of providing portrait images of high quality. In particular, the quality of the portraits derived with the camera of the invention is unaffected by unwanted degrees of perspective distortion. As an additional aspect of this quality, the subjects of the portraits are properly illuminated, there being no unduly harsh shadows and the lighting having a desirably uniform distribution over the subject.

Being suited for use within the amateur or high volume market, the camera of the invention achieves the foregoing desirable features of performance through a unique combination of operational elements. These elements cooperate to somewhat stabilize the photographic parameters of the exposure while providing optimized performance under such stable photographic conditions.

The camera of the invention is characterized in combining a flash source of illumination having a specially adjusted output in combination with an imaging system of relatively long focal length. Without adjustment, conventionally packaged flash units function to illuminate a field of view of relatively broad and angular extent. With the present invention, this output characteristic is varied through the use of a positive lens mounted upon the camera body in an orientation to intercept substantially all of the illumination from the flash source and re-direct the illumination within a field of relatively narrow angular extent. As a result, a highly desirably lighting effect is achieved. For instance, sufficient light is directed toward the photographic subject without causing ophthalmic discomfort; relatively lower cost imaging systems may be used with the camera in view of the improved lighting control; and light which does reach the subject appears to emanate from a larger source, thereby softening the effect of the light over the photographic subject.

A further object of the invention is to provide a photographic camera incorporating an imaging arrangement for forming an image of a field of view of relatively narrow angular extent at the exposure plane of the camera. The camera incorporates a source of flash illumination of a variety in which each flashlamp used with the camera is combined with a cooperating contoured reflector. The flash system of the camera incorporates a positive lens arrangement mounted upon the camera body in a position to intercept illumination from the flashlamp and contoured cooperative reflector so as to re-direct the illumination toward a photographic subject within an illumination field of relatively narrow angular extent.

As another feature and object of the invention, the above described camera incorporates means for establishing a predetermined camera-to-subject distance so as to control with consistency the parameters over each photographic exposure. To achieve additional exposure control, the camera may feature a shutter system having a synchronized flash actuation arrangement wherein the flash must be activated with each exposure.

As another object, the camera of the invention may combine a packaged flashlamp unit with a positive lens in a manner wherein the lamp source is spaced from the positive lens a distance less than the focal length of the positive lens. With such an arrangement, an improved light distribution over the subject of a photographic portrait is achieved.

Other objects of the invention will in part be obvious and will in part appear hereinafter.

The invention, accordingly, comprises the apparatus possessing the features, techniques and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 1 is a perspective view of a photographic camera according to the invention in combination with a diagrammatic representation of certain features of its operation;

FIG. 2 is a fragmentary side elevation of the photographic camera of FIG. 1, with portions broken away to reveal internal structure.

DETAILED DESCRIPTION

Figure 3:
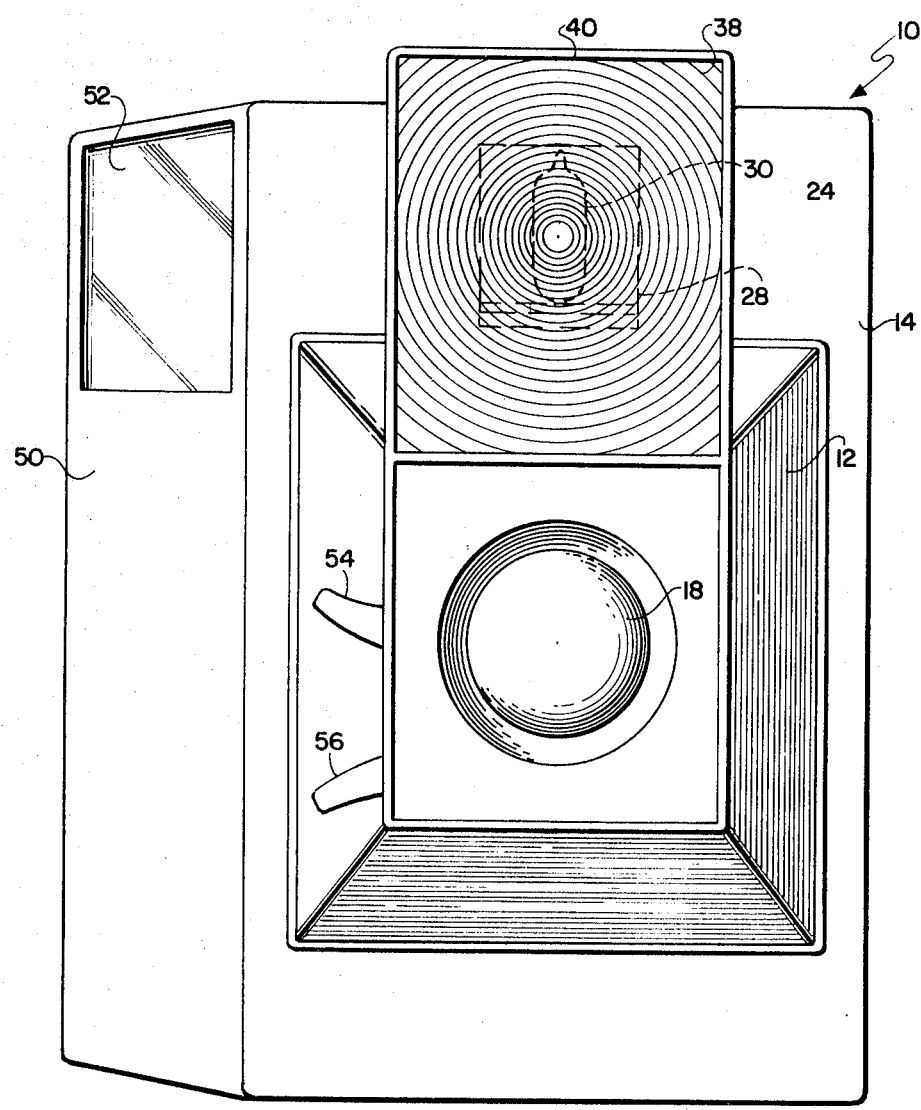
FIG. 3 is a front elevation view of the camera of FIG. 1.

The camera of the present invention is ideally suited for amateur portrait photography. It features a unique illuminating arrangement serving to enhance the quality of subject lighting as derived from a typical packaged multi-lamp flash array. To achieve improved quality for portrait imaging the camera is formed incorporating a relatively long focal length lens in combination with a housing structure providing for a field of view of relatively narrow angular extent. This imaging system is designed in conjunction with a film format of a size popular in amateur photography. In a preferred embodiment, photographic and exposure parameters such as subject distance, shutter speed and relative aperture are fixed at predetermined optimum settings or values. As a result, the camera is capable of producing portraits of consistently desirable quality.

Referring to FIGS. 1 and 3, a camera incorporating features of the present invention is illustrated generally at 10. Camera 10 is characterized by the presence of an elongated exposure chamber 12. Exposure chamber 12 is of rectangular cross section and forms part of the imaging system of the camera. The exposure chamber 12 extends from and is integrally formed with a film receiving portion 14 which function to removably retain a quantity of photosensitive material or film for sequential exposure at an exposure plane or station. In a preferred arrangement for the camera, portion 14 of the camera body 10 is designed to accept and process film units of a variety which may be processed immediately following exposure. Such photographic systems and apparatus are now well known in the art and are described in detail in such references as U.S. Pat. No. 3,499,373, entitled "Photographic Apparatus" by E. D. Cotta. To permit its fabrication on a high volume scale, the camera body 10 may be fabricated from a moldable plastic which is shock resistant as well as opaque to actinic radiation.

Film receiving portion 14 of the camera is configured to operate in conjunction with a film format of predetermined desirable size. For any given film format, the exposure and imaging system of the camera is designed and configured such that the image of a photographic subject or portion thereof will be pleasingly framed within any resultant photograph. Additionally, and of particular importance, the resultant image should be free of the distortive effects otherwise encountered with conventional lens and imaging systems. The present arrangement incorporates an objective lens 18 having a relatively long focal length for overcoming perspective distortion. This focal length is additionally selected to avoid a flattening of the features of the subject. The latter effect results from a lens arrangement of excessive focal length. As a practical compromise, a lens 18 having a focal length which is at least about twice as great as the diagonal of the film format selected is considered to produce optimized portrait quality. Variations above or below the above-noted ratio may be selected to achieve subjectively desired results.

Proper framing of the image of subject 16 at the exposure plane of the camera is achieved by the incorporation of objective lens 18 within the forwardmost portion of elongated exposure chamber 12. With such an association, the imaging system forms an image of a field of view of relatively narrow angular extent at the exposure plane of the camera. Thus configured, the imaging system including exposure chamber 12 and lens 18 permits ideal framing of the image of subject 16 while requiring a relatively simple lens structure 18. A consistency of illumination across a resultant photograph is easier maintained with the reduced or relatively narrow field angle. This field angle is indicated at x, extending between peripheral light rays 20 and 22.

With the present form of lens, illumination at the exposure plane may tend to "fall off" or diminish by a factor $(\cos \theta)^4$ where $\theta$ is the off axis angle. With the restricted angular field of view in the present arrangement, the above diminution is dismissable.

A further consideration in the design of the imaging system of the camera resides in the selection of relative aperture at which it is called upon to perform. A scaling of the lens of conventional focal length to perform as a longer focal length lens requires a greater aperture width in order to retain a given F number. Such increases in aperture size alter the performance of the imaging system by decreasing depth of field. For desirable portrait performance, the depth of field of the system is preferably in order of about 6 inches or enough for producing a sharp definition of both the forwardmost and rearward features of a human head. As a consequence of these considerations, imaging system as now described are called upon to operate at higher aperture values, thereby requiring correspondingly higher levels of illumination.

The practical aspects of producing a popular priced camera tend to require that subject illumination be supplied by conventional flash illumination sources. Particularly, the camera should be operable with packaged multi-lamp flash arrays presently available in commerce. These multi-lamp flash units may assume any number of configurations, for instance cubic, and are structured to support each of the series of flashlamps in conjunction with cooperating contoured reflectors. Typical of the cubic flash array structures is that described in U. S. Pat. No. 3,244,087, entitled "Photographic Flashlamp Unit." Generally, these flash sources are incapable of adequately illuminating subjects where they are to be photographed with the imaging systems now contemplated. Flash units of higher illumination capacity may achieve adequate levels of lighting, however, they tend to cause harsh shadows upon the subject as well as cause ophthalmic discomfort to the subject being photographed. Improved portrait results are realized with somewhat softened lighting and such lighting sources seldom cause eye discomfort.

Looking to FIG. 1, the illumination unit for the camera 10 is generally depicted at 24. Unit 24 is operative to illuminate subject 16 from a camera-to-subject distance shown in the drawing as "D". For cameras as presently described distance "D" is established at about 3.5 feet. Conventional flash units of a packaged multi-lamp variety are not designed as efficient illuminators of subjects within a relatively narrow field angle; much of their light is directed at larger angles outside the angular extent of a smaller field. Accordingly, illumination assembly 24 is structured to control the output of a packaged multi-lamp flash unit to both achieve higher levels of illumination and to improve the uniformity or quality of that lighting.

Looking to FIG. 2, illumination assembly 24 is shown to include a mounting platform 26 fixed to the upward surface of elongated exposure chamber 12. Platform 26 serves to rotatably support a flash cube 28 in a position selectively elevated from the optical axis of objective lens 18. Flash cube 28 is formed as a package containing vertically oriented flash lamps as at 30 in a position forwardly of cooperating contoured reflectors as at 32.

In the orientation shown, the flashlamp 30 and its cooperating reflector 32 will illuminate a field of view of relatively broad angular extent. The latter angular extent is indicated by the angle B shown extending between extreme output light rays 34 and 36.

An echelon or Fresnel lens as at 38 is positioned forwardly of flash cube 28 and configured and oriented so as to intercept substantially all of the illumination generated by it. Configured as a positive lens, Fresnel lens 38 is mounted forwardly from flash cube 28 and is supported upon exposure chamber 12 by a peripheral housing 40. As depicted in FIG. 2, Fresnel lens 38 is selectively spaced a distance denoted as "d" from the peripheral boundary 42 of the forwardly facing opening of the flash cube 28. With the arrangement shown, the positive lens performance of Fresnel lens 38 will cause the illuminating field of relatively broad angular extent of cube 28 to be redirected as a field of relatively narrow angular extent with respect thereto. This redirected field is indicated by the external or bounding light rays 44 and 46 subtending the angle $\gamma$.

Thus redirected, the illumination from flash cube 28 is channeled into the area of interest of the imaging system of the camera. The lower output intensity of the lamp 30, when extended over the intercepting area or cross section of lens 38, presents a softened light source to the subject 16. With such an arrangement, harsh shadows and the like are avoided at the subject; the light is more evenly dispersed about the subject; and any ophthalmic discomfort on the part of the subject otherwise induced is largely avoided. Further, if a Fresnel or echelon form of lesser quality may be used for lens 38, a degree of desirable diffusion within the output of the arrangement 24 is achieved.

The distance "d" established between the forward periphery 42 of flash cube 28 and positive lens 38 may be optimized for enhancing the quality of lighting at subject 16. Where the distance "d" is selected as having a value less than the focal length of lens 38, an enlarged virtual image of the light source will be derived slightly rearwardly of the source. As a consequence, a more desirable distribution of lighting will be realized. Should the distance "d" be made equal to the focal length of lens 38, the illumination source will be focused at infinity, which, for practical consideration may be considered at the subject 16. Such focusing may tend to form a "hot spot" or area of unwanted highlighting upon the subject's countenance. Where the distance "d" is made greater than the focal length of lens 38, the light emerging from lens 38 will be focused in front of subject 16. The resultant lighting will vignette and be of lower level. With the preferred orientation of flash source 28 and lens 38, the source of illumination of the photographic system appears to emanate from a larger area of the same intensity.

In addition to orienting the flash cube 28 for operation in conjunction with positive lens 38, mounting platform 26 also serves to position the light source at a select elevation above the axis of objective lens 18. Should the light source be positioned somewhat adjacent to the optical path of the lens 18, retinal retro-reflections may occur which result in an undesirable red coloration of the eye of the image recorded upon a color film unit. A select displacement of the light source from the optical path 18 tends to minimize a retinal retro-reflection into the taking lens of the camera.

The elevation of the flash source by mounting platform 26 additionally serves to improve the quality of the lighting at subject 16. When camera 10 is operated in the vertical orientation depicted in FIG. 1, shadows will occur somewhat behind the head of subject 16. As a consequence, the shadows will not be discernable in a resultant photograph. Further, shadows from the subject 16 head will be displaced downwardly so as to minimize or eliminate a "halo" effect. The presence of such peripheral background shadows tend to make the image of a subject's head appear larger than it actually is.

In its preferred embodiment, the camera 10 incorporates pre-established and fixed exposure parameters. More significant among the fixed parameters is the operation of the camera at a predetermined optimum camera-to-subject distance "D" representing a fixed optical conjugate of lens 18. Distance "D" is established by a viewfinder-range establishing assembly 50 shown in FIGS. 1 and 3. Assembly 50 has an elongate window 52 behind which are positioned appropriate coincidence range establishing elements and viewfinder framing systems. A particular configuration for such a viewfinder and range establishing system is disclosed in a co-pending application for United States patent by Bruce K. Johnson, entitled "Viewfinder and Distance Establishing Device for a Photographic Camera," Ser. No. 50,380 filed of even date herewith and assigned in common herewith. The pre-establishing of subject distance "D" permits a simplified imaging system as well as a shutter assembly of fixed speed. Further, the pre-establishing of this distance derives a consistent high quality framing of the subject 16 as well as a desired consistency in the quality of lighting at the subject area.

The shutter mechanism for the camera 10 (not shown) is positioned rearwardly of the objective lens 18. A shutter mechanism particularly suitable for use with the present camera is described in a co-pending application for United States patent entitled, "Self-Cocking Photographic Shutter" by Bruce K. Johnson, Ser. No. 50,378, now U.S. Pat. No. 3,659,513, filed of even date herewith and assigned in common herewith. The shutter assembly includes a trigger member 54 which is manually depressed to actuate the shutter as well as synchronously activate the flashlamp 30 of the illumination assembly 24. Inasmuch as long focal length imaging systems of the type described heretofore are relatively sensitive to camera movement, the movable trigger element 54 of the shutter mechanism is arranged to cooperate with a stationary trigger element 56. Stationary element 56 is generally aligned with element 54 and is fixed to chamber 12. Thus configured, the shutter triggering arrangement permits element 54 to be manually squeezed against stationary element 56 while manual support of the camera is provided. As a result, relative camera movement is minimized. The shutter arrangement preferably is one which is inoperative in the absence of a source of artificial illumination at 24.

As may be evidenced from the foregoing the photographic camera of the invention retains the capability of providing a photographic portrait of high quality while being fabricable using high volume, low cost techniques. The camera utilizes a novel illumination system providing for uniform illumination over the area of a subject using conventional flash sources. The imaging system of the camera optimizes perspective distortion of the recorded image. Further, the imaging system is simple and relatively inexpensive to fabricate.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A hand-held camera suited for portrait photography comprising:
    camera body means for supporting photosensitive material of at least snapshot size format at an exposure plane;
    mounting means positioned upon said camera body means for supporting a source of flash illumination and including positive lens means having a given focal length and mounted upon said camera body means in a position spaced from said source a distance less than said focal length for intercepting illumination therefrom and forming an enlarged virtual image thereof;
    imaging means including an objective lens mounted upon said camera body means for forming within a field of view of narrow angular extent an image of a photographic subject framed for portraiture at said exposure plane;
    ranging means mounted upon said camera body means for controlling the positioning of said camera body means to establish a minimum camera-to-subject distance selected to substantially reduce perspective distortion of the image of said subject at said exposure plane; and
    shutter means for activating said source of illumination in synchronism with the exposure of said photosensitive material.

2. The hand-held camera of claim 1 in which said camera body means includes an elongate exposure chamber the forwardmost portion of which is configured to retain said shutter means including manually movable trigger means for effecting said exposure and a stationary trigger element cooperatively disposed with respect to said manually movable trigger means.

3. The hand-held camera of claim 1 wherein:
    said photosensitive material format is rectangular, having a predetermined diagonal dimension; and
    said imaging means objective lens is selected having a focal length equivalent to about twice the said diagonal dimension of said format.

4. The hand-held camera of claim 1 in which said ranging means camera-to-subject distance is predetermined and fixed.

5. The hand-held camera of claim 1 in which said positive lens means includes an echelon lens.

6. The hand-held camera of claim 1 in which:
said source of flash illumination is structured having a given light emission area and is configured to illuminate a field of view of relatively broad angular extent; and
said positive lens means is configured to redirect said illumination within a field of relatively arrow angular extent with respect to that of said source of flash illumination.

7. The hand-held camera of claim 6 wherein:
said photosensitive material format is rectangular, having a predetermined diagonal dimension; and
said imaging means objective lens is selected having a focal length equivalent to about twice the said diagonal dimension of said format.

8. The hand-held camera of claim 6 in which said mounting means is configured for mounting a multilamp flash array each lamp within which is formed in combination with a contoured reflector, the periphery of which defines the periphery of said given light emission area.

9. The hand-held camera of claim 6 in which said positive lens means is configured having a light accepting surface area substantially larger than said given light emission area and is formed and arranged to intercept substantially all illumination therefrom.

10. The hand-held camera of claim 6 in which said ranging means camera-to-subject distance is predetermined and fixed.

11. The hand-held camera of claim 10 in which said predetermined fixed distance is selected as about 3.5 feet.

* * * * *